Patented June 4, 1929.

1,715,871

UNITED STATES PATENT OFFICE.

MAX SPEICHERT, OF BERLIN-TEMPELHOF, GERMANY, ASSIGNOR TO HÜTTENWERKE TEMPELHOF A. MEYER, OF BERLIN-TEMPELHOF, GERMANY, A FIRM.

METHOD OF OBTAINING COPPER SULPHATE.

No Drawing. Application filed January 10, 1927, Serial No. 160,303, and in Germany January 13, 1926.

My invention relates to a method of obtaining copper sulphate from alloys or mixtures of copper with tin, lead, and antimony and from the residues such as scraps, ashes and the like obtained in metallurgical operations to which the said alloys or mixtures are subjected, the said residues containing chemically bound oxygen besides certain impurities.

Hitherto, copper was obtained from the said alloys and mixtures only by melting and blowing processes which, however, do not secure a complete separation of copper from the other metals. The best result obtainable is an alloy of copper and tin in about equal proportions in which alloy the tin is of less value than in its pure state, while the copper therein contained is not commercially valued at all. As to the residues there were no economical methods for extracting the copper therefrom.

Now, according to my invention it is possible to completely extract the copper from the said alloys or mixtures in a valuable form. My invention consists in treating the said starting materials in a manner suitable for transforming them into a mixture of the sulfides of the metals present, for instance by melting them with sulfur, then roasting the mixture of sulfides, and leaching with sulfuric acid, the roasted material containing copper protoxide, copper oxide and copper sulfide formed in the roasting operation. The solution contains, in the form of copper sulphate, all copper present in the starting material. The copper sulphate is then separated in any convenient manner, and the separated copper sulphate or the solution may be subjected to any further suitable or usual treatment.

In a similar manner also the residues above referred to and obtained in metallurgical operations from alloys or mixture of copper with the said other metals may be treated and the copper separated therefrom.

If the starting material contains slight proportions of zinc, they are separated together with the copper without, however, producing any disadvantageous effects.

From the copper sulphate obtained metallic copper may be prepared in any known manner if desired. The residue obtained in the leaching process may be further treated in any known manner for separating tin, lead and antimony therefrom.

Example 1.

A metal containing 40% of tin, 12% of antimony, 10% of lead and 38% of copper is melted with the equivalent quantity of sulfur. The sulfide mixture obtained is roasted, protoxides, oxides and sulphates of the metals present being formed. The roasted product is leached with a quantity of dilute sulfuric acid corresponding to the copper and lead contents, all copper being transformed into sulphate. The residue contains all tin, antimony and lead present and is further treated in any known manner for separating these metals.

Example 2.

Metal residues containing 30% of tin, 5% of antimony, 20% of lead, 15% of copper and 30% of chemically bound oxygen and impurities are melted together with an equivalent quantity of sulfur. The sulfide mixture obtained is roasted and treated with sulfuric acid as described in Example 1, the copper sulphate solution thus formed is separated from the residue which contains all tin, lead and antimony. The copper sulphate solution and the residue are treated in any usual manner for separating the metals.

What I claim is:—

1. A process for producing copper sulphate solution, consisting of melting an alloy composed of copper, tin, lead and antimony with sulfur so as to produce a mixture of the sulfides of said metals, roasting said sulfide mixture, leaching the roasted product with sulfuric acid, and removing the insoluble residue resulting therefrom.

2. A process for producing copper sulphate solution, consisting of melting cupriferous material containing copper, tin, lead, antimony and chemical bound oxygen with sulfur in order to produce a mixture of the sulfides of said metals, roasting said sulfide mixture, leaching the roasted product with sulfuric acid, and removing the insoluble residue resulting therefrom.

3. A process for obtaining copper sulphate, which consists in producing a mixture of the sulfides of the metals in alloys containing copper, tin, lead and antimony, changing part of the copper sulfide in said mixture to cuprous oxide and cupric oxide, and dissolving said cuprous oxide and cupric oxide in weak sulfuric acid.

4. A process for obtaining copper sulphate, which consists in producing a mixture of the sulfides of the metals contained in alloys composed of copper, tin, lead and antimony by melting said alloys with sulfur, changing part of the copper sulfide in the sulfide mixture to cuprous oxide and cupric oxide by roasting said sulfide mixture, leaching said roasted product with weak sulfuric acid, and separating the solution thus obtained from the insoluble residue.

In testimony whereof I have affixed my signature.

MAX SPEICHERT.